US011189001B2

(12) United States Patent
Kim

(10) Patent No.: US 11,189,001 B2
(45) Date of Patent: Nov. 30, 2021

(54) IMAGE SIGNAL PROCESSOR FOR GENERATING A CONVERTED IMAGE, METHOD OF OPERATING THE IMAGE SIGNAL PROCESSOR, AND APPLICATION PROCESSOR INCLUDING THE IMAGE SIGNAL PROCESSOR

(71) Applicant: Samsung Electronics Co., Ltd., Suwon-si (KR)

(72) Inventor: Dong-hoon Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/511,397

(22) Filed: Jul. 15, 2019

(65) Prior Publication Data

US 2020/0098079 A1    Mar. 26, 2020

(30) Foreign Application Priority Data

Sep. 21, 2018    (KR) .................... 10-2018-0114379

(51) Int. Cl.
*G06T 1/20* (2006.01)
*G06T 3/60* (2006.01)
(Continued)

(52) U.S. Cl.
CPC .............. *G06T 1/20* (2013.01); *G06K 9/4609* (2013.01); *G06T 3/606* (2013.01); *G09G 5/39* (2013.01); *G09G 2340/0492* (2013.01)

(58) Field of Classification Search
CPC .. G06T 1/20; G06T 3/606; G06T 1/60; G06K 9/4609; G06K 9/00791; G09G 5/39;
(Continued)

(56) References Cited

U.S. PATENT DOCUMENTS 4,947,344 A    8/1990  Hayashi et al.
5,079,639 A *  1/1992  Mochinaga .......... H04N 1/0476
                                                      358/473
(Continued)

FOREIGN PATENT DOCUMENTS

CN    101416217 A    4/2009
TW    201537980 A   10/2015
TW    201729409 A    8/2017

OTHER PUBLICATIONS

Office Action dated Jul. 28, 2021, issued in corresponding Chinese Application No. 201910774567.7.
(Continued)

*Primary Examiner* — Maurice L. McDowell, Jr.
*Assistant Examiner* — Donna J. Ricks
(74) *Attorney, Agent, or Firm* — Harness, Dickey & Pierce, P.L.C.

(57) ABSTRACT

An image signal processor for generating a converted image based on a raw image includes processing circuitry configured to store data corresponding to a plurality of lines of a received image in a line buffer, perform an image processing operation by filtering the data stored in the line buffer based on at least one filter, and divide the raw image into a plurality of sub-images and request the plurality of sub-images from a memory in which the raw image is stored, such that the plurality of sub-images are sequentially received by the line buffer, a width of each of the plurality of sub-images being less than a width of the line buffer, and the plurality of sub-images being parallel to each other.

15 Claims, 14 Drawing Sheets

(51) Int. Cl.
*G06K 9/46* (2006.01)
*G09G 5/39* (2006.01)

(58) Field of Classification Search
CPC ....... G09G 2340/0492; G09G 2340/02; G09G 2360/122; G09G 5/393; G09G 5/395; G09G 5/42; H04N 5/23229
See application file for complete search history.

(56) References Cited

U.S. PATENT DOCUMENTS

| | | | |
|---|---|---|---|
| 6,496,192 B1 | 12/2002 | Shreesha et al. | |
| 6,801,674 B1 | 10/2004 | Turney | |
| 7,307,635 B1 | 12/2007 | Yang et al. | |
| 9,202,444 B2 | 12/2015 | Jackson | |
| 9,336,579 B2 | 5/2016 | Xu et al. | |
| 9,350,899 B2 | 5/2016 | Li et al. | |
| 9,681,055 B2* | 6/2017 | Ju | H04N 5/23264 |
| 2006/0140498 A1* | 6/2006 | Kudo | G06T 1/60 382/254 |
| 2010/0073491 A1 | 3/2010 | Huggett | |
| 2015/0070530 A1* | 3/2015 | Tanaka | H04N 5/772 348/231.99 |
| 2015/0296193 A1* | 10/2015 | Cote | H04N 9/04517 382/167 |
| 2017/0161873 A1* | 6/2017 | Dabral | H04N 9/04515 |
| 2017/0372452 A1 | 12/2017 | Wang | |
| 2020/0051260 A1* | 2/2020 | Shen | G06N 3/04 |
| 2020/0137334 A1* | 4/2020 | Hu | H04N 5/3653 |

OTHER PUBLICATIONS

Office Action dated Aug. 9, 2021, issued in corresponding Taiwanese Application No. 108133887.

* cited by examiner

IMAGE SIGNAL PROCESSOR FOR GENERATING A CONVERTED IMAGE, METHOD OF OPERATING THE IMAGE SIGNAL PROCESSOR, AND APPLICATION PROCESSOR INCLUDING THE IMAGE SIGNAL PROCESSOR

CROSS-REFERENCE TO RELATED APPLICATION

This application claims the benefit of Korean Patent Application No. 10-2018-0114379, filed on Sep. 21, 2018, in the Korean Intellectual Property Office, the disclosure of which is incorporated herein in its entirety by reference.

BACKGROUND

Inventive concepts relates to an image signal processing technique, and more particularly, to an image signal processor configured to image-process raw image data received from an image sensor, a method of operating the image signal processor, and an application processor (AP) including the image signal processor.

An image signal processor included in an imaging device, such as a camera and a smartphone, may image-process a raw image provided by an image sensor and generate a converted image, such as an RGB image and/or a YUV image. The converted image may be compressed based on a compression technique, such as joint photographic experts group (JPEG), moving picture experts group (MPEG), and H.264, and stored in a storage and/or displayed on a display device. The image signal processor may include a line buffer. The image signal processor may store a plurality of lines of the raw image in the line buffer and perform an image processing operation in units of the plurality of stored lines.

In recent years, the sizes of raw images may increase with an increase in the resolution of image sensors. Since an area of a line buffer occupies a considerable portion of an area of an image signal processor, when a size of the line buffer is increased to image-process a raw image, the area (e.g., hardware size, width) of the image signal processor may increase. Accordingly, a method of processing a raw image provided by a high-resolution image sensor without increasing the size of the line buffer is needed (or desired).

SUMMARY

Example embodiments of the inventive concepts provide an image signal processor, which may image-process a raw image provided by a high-resolution image sensor without increasing a size of a line buffer, a method of operating the image signal processor, and an application processor (AP) including the image signal processor.

According to some example embodiments of the inventive concepts, there is provided an image signal processor for generating a converted image based on a raw image provided by an image sensor. The image signal processor includes processing circuitry configured to store data corresponding to a plurality of lines of a received image in a line buffer, perform an image processing operation by filtering the data stored in the line buffer based on at least one filter, and divide the raw image into a plurality of sub-images and request the plurality of sub-images from a first memory in which the raw image is stored, such that the plurality of sub-images are sequentially received by the line buffer, a width of each of the plurality of sub-images being less than a width of the line buffer, and the plurality of sub-images being parallel to each other.

According to some example embodiments of the inventive concepts, there is provided a method of operating an image signal processor configured to image-process a raw image generated by an image sensor. The image signal processor includes a line buffer having a size smaller than a width of the raw image and at least one filter. The method includes dividing the raw image into a plurality of stripe images, a size of each of the plurality of stripe images in a first direction being less than the size of the line buffer, and the plurality of stripe images being parallel to each other, sequentially image-processing the plurality of stripe images by using the line buffer and the at least one filter to generate a plurality of converted stripe images, and merging the plurality of converted stripe images into a converted image having a same size as the raw image.

According to some example embodiments of the inventive concepts, there is provided an application processor including an image signal processor configured to image-process a raw image generated by an image sensor and generate a converted image, and an image compression encoder configured to compress the converted image. In a second operation mode, the image signal processor is configured to divide the raw image into a plurality of sub-images, sequentially image-process the plurality of sub-images, and generate a plurality of converted sub-images.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
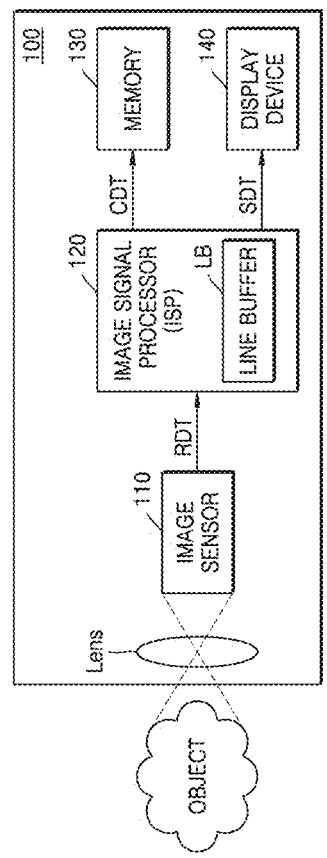
FIG. 1 is a block diagram of an image processing system according to some example embodiments.

FIG. 1 is a block diagram of an image processing system 100 according to some example embodiments.

The image processing system 100 may be embedded in an electronic device and/or implemented as an electronic device. For example, the electronic device may be implemented as a personal computer (PC), an Internet of Things (IoT) device, and/or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MPEG-1 audio 3 (MP3) player, a handheld game console, an electronic book (e-book), and/or a wearable device.

Referring to FIG. 1, the image processing system 100 may include an image sensor 110, an image signal processor 120, a memory 130, and a display device 140.

The image sensor 110 may convert an optical signal of an object OBJECT, which is incident through an optical lens, into an electric signal or an image (e.g., image data). The image sensor 110 may include, for example, a pixel array including a plurality of pixels, which are two-dimensionally arranged, and a sensing circuit. The pixel array may convert received optical signals into electric signals. For example, the pixel array may be implemented as photoelectric conversion elements, such as charge-coupled devices (CCDs) or complementary metal-oxide-semiconductor (CMOS) elements. In addition, the pixel array may be implemented as various kinds of photoelectric conversion elements. The sensing circuit may convert an electric signal provided by the pixel array into image data and output the image data as a raw image RDT. The image sensor 110 may be implemented as a semiconductor chip including a pixel array and a sensing circuit, for example.

The image signal processor 120 may image-process the raw image RDT provided by the image sensor 110 and generate a converted image CDT. For example, the image signal processor 120 may image-process the raw image RDT based on one or more of a set white balance, a parameter, and/or a color space. The converted image CDT may be a color-space image, such as an RGB image and/or a YUV image, for example. A size (e.g., resolution) of the converted image CDT may be equal to that of the raw image RDT. The converted image CDT may be stored in the memory 130. The memory 130 may be a volatile memory, such as dynamic random access memory (DRAM) and/or static RAM (SRAM), or a non-volatile memory, such as a phase-change RAM (PRAM), resistive RAM (ReRAM), and/or flash memory. The converted image CDT stored in the memory 130 may be subsequently used by the image processing system 100 and/or stored in a storage device (not shown).

In addition, the image signal processor 120 may reduce or increase a size of the converted image CDT and generate a scaled image SDT. For example, the image signal processor 120 may scale the size (e.g., resolution) of the converted image CDT such that the scaled image SDT corresponds to a resolution of the display device 140. The image signal processor 120 may output the scaled image SDT to the display device 140 to be displayed, for example.

The image signal processor 120 may include a line buffer LB configured to store data corresponding to a plurality of lines of an image (e.g., the raw image RDT) received from the image sensor 110. The image signal processor 120 may perform an image processing operation using the line buffer LB. The image signal processor 120 may temporarily store data corresponding to a plurality of lines of the raw image RDT in the line buffer LB and perform an image processing operation (e.g., a filtering operation) on the data corresponding to the plurality of lines. For example, the image signal processor 120 may store data of N lines (where N is an integer equal to or greater than 2) of the raw image RDT in the line buffer LB and perform an image processing operation on the data of the N lines. When the image processing operation on the data of the N lines is completed, the image signal processor 120 may store data of at least one next line of the raw image RDT in the line buffer LN, update line data temporarily stored in the line buffer LN, and perform an image processing operation on the updated line data.

In some example embodiments, when a width of an input image (e.g., the raw image RDT provided by image sensor 110) is greater than a size (e.g., width) of the line buffer LB, the image signal processor 120 may divide the input image into a plurality of sub-images in a column direction and sequentially image-process the plurality of sub-images. The plurality of sub-images may be referred to as a plurality of column images or a plurality of vertical stripe images, for example.

The image signal processor 120 may receive one sub-image (e.g., a first sub-image) from among the plurality of sub-images, store the received sub-image in the line buffer LB, and image-process the stored sub-image. When the image-processing of the sub-image stored in the line buffer LB is completed, the image signal processor 120 may receive another sub-image (e.g., a second sub-image), store the received sub-image in the line buffer LB, and image-process the stored sub-image. An image division method of the image signal processor 120, which includes an image division operation and an image reconfiguration operation, will be described in detail below with reference to FIG. 2.

Figure 2:
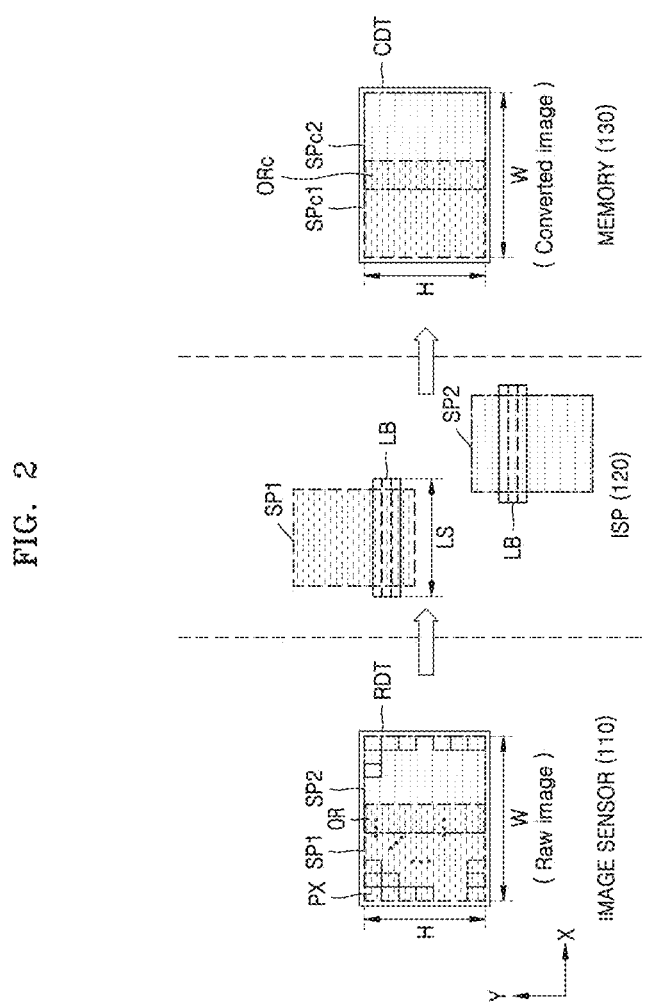
FIG. 2 is a diagram of an image division method according to some example embodiments.

FIG. 2 is a diagram illustrating an image division method according to some example embodiments. The image division method of FIG. 2 may be performed by the image signal processor 120 in the image processing system 100 of FIG. 1, for example.

Referring to FIG. 2, a raw image RDT generated by an image sensor 110 may include a plurality of pieces of pixel data PX arranged in rows in a first direction (e.g., X-axis direction) and columns in a second direction (e.g., Y-axis direction) that is perpendicular to the first direction. Hereinafter, a data length of the raw image RDT in the first direction may be defined as a width W of the raw image RDT, and a data length of the raw image RDT in the second direction may be defined as a height H of the raw image RDT. For instance, when a size (e.g., resolution) of the raw image RDT includes a width W of 4000 bits and a height H of 3000 bits, the raw image RDT may include 3000 lines, and each of the 3000 lines may include 4000 pieces of pixel data PX, although example embodiments are not limited thereto.

A line buffer LB may store data corresponding to a plurality of lines of a received input image, and a size LS (or width) of the line buffer LB may refer to the number of pieces of pixel data PX included in one of the plurality of lines.

As described above with reference to FIG. 1, the image signal processor 120 may temporarily store data (referred to as line data) corresponding to a plurality of lines of the raw image RDT in the line buffer LB and image-process the stored line data. When the width W of the raw image RDT is less than or equal to the size LS of the line buffer LB, the raw image RDT may be stored in units of a plurality of lines in the line buffer LB. Accordingly, the image signal processor 120 may image-process the raw image RDT. However, when the width W of the raw image RDT is greater than the size LS of the line buffer LB, the raw image RDT is not stored in units of a plurality of lines in the line buffer LB. Thus, it may not be possible for the image signal processor 120 to image-process the raw image RDT when the width W of the raw image RDT is greater than the size LS of the line buffer.

However, in the image processing system 100 according to some example embodiments, when the width W of the raw image RDT is greater than the size LS of the line buffer LB, the raw image RDT may be divided into a plurality of sub-images in the first direction (e.g., X-axis direction), and the image signal processor 120 may sequentially receive the plurality of divided sub-images as an input image and store the input image in units of a plurality of lines in the line buffer LB. Accordingly, the image signal processor 120 may sequentially image-process the received input image (e.g., the plurality of sub-images) and image-process the raw image RDT, even when the width W of the raw image RDT is greater than the size LS of the line buffer LB.

As shown in FIG. 2, the raw image RDT may be divided into a plurality of sub-images (e.g., a first sub-image 7 and a second sub-image SP2) having the same length in the second direction (e.g., the Y-axis direction), that is, a column direction. For example, the image signal processor 120 may divide the raw image RDT into the plurality of sub-images. A height of the first sub-image SP1 and the second sub-image SP2 may be equal to a height of the raw image RDT, and a width of the first sub-image SP1 and the second sub-image SP2 may be less than the size LS of the line buffer LB. The first sub-image SP1 may partially overlap the second sub-image SP2 (or vice versa) to enable a boundary processing operation for preventing (limiting or reducing) a sharp change in image at a boundary between the first sub-image SP1 and the second sub-image SP2. In some example embodiments, a width of an overlap region OR (e.g., an area in which the first sub-image SP1 and the second sub-image SP2 partially overlap each other) may be determined based on a size of at least one filter used for the image signal processor 120.

Although FIG. 2 illustrates an example embodiment in which the raw image RDT is divided into two sub-images, that is, the first sub-image SP1 and the second sub-image SP2, the inventive concepts are not limited thereto, and the raw image RDT may be divided into at least three sub-images, according to some other example embodiments. In some example embodiments, the number of sub-images into which the raw image RDT is to be divided may be determined based on the width W of the raw image RDT, the size LS of the line buffer LB, and the width of the overlap region OR.

The image signal processor 120 may sequentially receive the plurality of sub-images as input images and sequentially image-process the received sub-images to generate a plurality of converted sub-images as output images. For example, the image signal processor 120 may receive the first sub-image SP1 and image-process the first sub-image SP1 to generate a first converted sub-image SPc1, and then receive the second sub-image SP2 and image-process the second sub-image SP2 to generate a second converted sub-image SPc2. The input images (e.g., the first sub-image SP1 and the second sub-image SP2), which are sequentially received by the image signal processor 120, may be stored in the line buffer LB in units of the plurality of lines, and image-processed in the units of the plurality of lines stored in the line buffer LB to generate the output images (e.g., the first converted sub-image SPc1 and the second converted sub-image SPc2).

The plurality of converted sub-images (e.g., the first converted sub-image SPc1 and second converted sub-image SPc2), which may be sequentially generated due to the image processing operation, may be stored in a memory 130 to reconfigure a converted image CDT. Both the first converted sub-image SPc1 and the second converted sub-image SPc2 may include a converted overlap region ORc. After the first converted sub-image SPc1 is stored, when the second converted sub-image SPc2 is stored, the image signal processor 120 may overwrite data of the converted overlap region ORc included in the first converted sub-image SPc1 with data of the converted overlap region ORc included in the second converted sub-image SPc2. Accordingly, the image signal processor 120 may merge the plurality of converted sub-images together to generate the converted image CDT. A size (e.g., resolution) of the converted image CDT may be equal to a size of the raw image RDT.

As described above, according to the image division method according to some example embodiments, when the width W of the raw image RDT provided by the image sensor 110 is greater than the size LS of the line buffer LB included in the image signal processor 120, the image signal processor 120 may divide the raw image RDT into a plurality of sub-images having a width less than the size LS of the line buffer LB and sequentially image-process the plurality of sub-images. Also, the image signal processor 120 may store a plurality of converted sub-images, which are generated due to the image processing operation, in the memory 130 and merge the plurality of converted sub-images to generate a converted image CDT having the same size as the raw image RDT. Thus, even if a size (e.g., the width W) of the raw image RDT provided by the image sensor 110 is increased, such that the width W of the raw image RDT is greater than the size LS of the line buffer LB, the image signal processor 120 may image-process the raw image RDT having the increased size without increasing the size LS of the line buffer LB, and hence, without increasing the area (e.g., hardware size, width) of the image signal processor 120.

Figure 3:
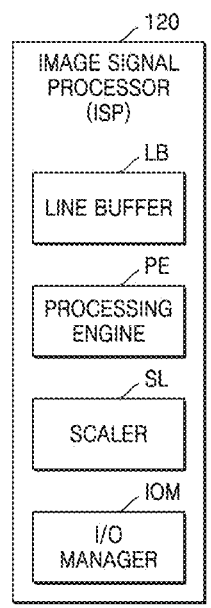
FIG. 3 is a schematic block diagram of an image signal processor according to some example embodiments.

FIG. 3 is a schematic block diagram of an image signal processor 120 according to some example embodiments.

Referring to FIG. 3, the image signal processor 120 may include at least one line buffer LB, a processing engine PE (also referred to as an image processing engine), a scaler SL, and an input/output (I/O) manager IOM. Although the line buffer LB and the processing engine PE are illustrated as separate components in FIG. 3, the inventive concepts are not limited thereto. In some other example embodiments, the line buffer LB may be included in the processing engine PE.

The line buffer LB, the processing engine PE, and the scaler SL may be implemented as hardware. For example, the line buffer LB, the processing engine PE, and the scaler SL may be implemented using processing circuitry, such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner. The line buffer LB may store an input image of the image signal processor 120 in units of a plurality of lines. In some example embodiments, based on a queue method, the line buffer LB may output a previously stored line and store a new line of the input image.

The processing engine PE may filter data (e.g., a plurality of lines of the input image) stored in the line buffer LB based on at least one filter and perform an image processing operation on the input image. The processing engine PE may include a plurality of image processing blocks, and at least one image processing block may access the line buffer LB and perform a filtering operation based on the at least one filter. For example, the plurality of image processing blocks may perform functions, such as bad pixel correction, lens shading compensation, white balance, denoising, demosaicing, sharpening, color compensation, and/or color space conversion. The processing engine PE may output a converted image and/or a plurality of converted sub-images. In some example embodiments, where the width of the raw image is less than or equal to the size of the line buffer LB, the processing engine PE may image-process the raw image (e.g., in units of a plurality of lines) and generate a converted image. In some other example embodiments, where the width of the raw image is greater than the size of the line buffer LB, the processing engine PE may sequentially image-process a plurality of sub-images into which the raw image is divided (e.g., in the order in which the plurality of sub-images are received by the line buffer LB) and generate a plurality of converted sub-images. The converted image and/or the plurality of converted sub-images may be stored in a memory (refer to the memory 130 in FIG. 1).

The scaler SL may scale a size of the converted image. For example, the scaler SL may increase or reduce a size of the converted image output by the processing engine PE and generate a scaled image. Also, the scaler SL may receive the converted image stored in the memory (refer to the memory 130 in FIG. 1) and scale the size of the converted image.

The I/O manager IOM may manage an input image and an output image of the image signal processor 120. In some example embodiments, a raw image RDT provided by the image sensor (refer to the image sensor 110 in FIG. 1) may be stored in a memory (e.g., the memory 130 of FIG. 1 and/or an embedded memory of the image sensor 110). The I/O manager IOM may divide the raw image RDT stored in the memory into a plurality of sub-images, such that at least two adjacent sub-images partially overlap each other, and sequentially request the plurality of sub-images from the memory (e.g., the memory 130 of FIG. 1 and/or the embedded memory of the image sensor 110) in which the raw image RDT is stored. For example, the I/O manager IOM may determine the number of sub-images into which the raw image RDT is to be divided, a width of each of the plurality of sub-images, and a width of the overlap region OR based on a size of the line buffer LB and a width W of the raw image RDT, and the I/O manager IOM may transmit a read command and addresses designating each of the plurality of sub-images having a width less than the size LS of the line buffer LB to the memory 130. Accordingly, the plurality of sub-images may be sequentially received by the line buffer LB. Also, the I/O manager TOM may sequentially store the plurality of converted sub-images (e.g., in an order in which the plurality of converted sub-images are generated due to the processing engine PE performing the image processing operation on the plurality of sub-images) in the memory (e.g., the memory 130 of FIG. 1) and merge the plurality of converted sub-images into a converted image having the same size (e.g., resolution) as the raw image.

The I/O manager IOM may determine the number of sub-images into which the raw image RDT is to be divided, a width of each of the sub-images, and a width of the overlap region OR between two adjacent sub-images that partially overlap each other. The I/O manager IOM may determine the width of the overlap region OR based on a size of the at least one filter used for the processing engine PE. The I/O manager IOM may determine the number of sub-images into which the raw image RDT is to be divided and the width of each of the sub-images based on the width W of the raw image RDT, the size LS of the line buffer LB, and the width of the overlap region OR.

In addition, when the plurality of converted sub-images are stored in the memory 130, the I/O manager IOM may designate an address of a region in which each of the plurality of converted sub-images are to be stored, such that the plurality of converted sub-images stored on the memory (e.g., the memory 130 of FIG. 1) constitute the converted image.

The I/O manager IOM may be implemented as hardware or a combination of software (or firmware) and hardware. In some example embodiments, when the I/O manager IOM is implemented as a combination of software (or firmware) and hardware, the I/O manager IOM may be implemented as source code in which the above-described functions are programmed and loaded in a memory included in the image signal processor 120 or stored in read-only memory (ROM), in combination with a processor (e.g., a microprocessor) included in the image signal processor 120 that may execute the software (or the firmware) so that functions of the I/O manager TOM may be implemented. In some other example embodiments, when the I/O manager IOM is implemented as hardware, the I/O manager IOM may include a logic circuit and a register and manage an input image and an output image based on register settings. The hardware or the combination of software (or firmware) and hardware implementing the I/O manager IOM, and the hardware implementing the line buffer LB, the processing engine PE, and the scaler SL, may be collectively referred to as processing circuitry of the image signal processor 120.

Figure 4A:
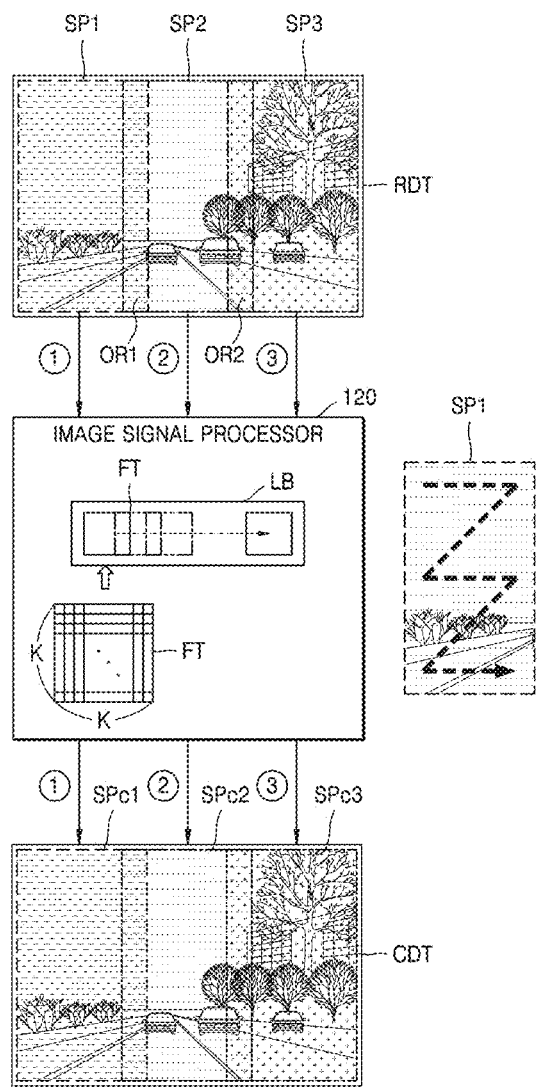
FIGS. 4A and 4B are diagrams illustrating operations of an image signal processor according to some example embodiments.
Figure 4B:
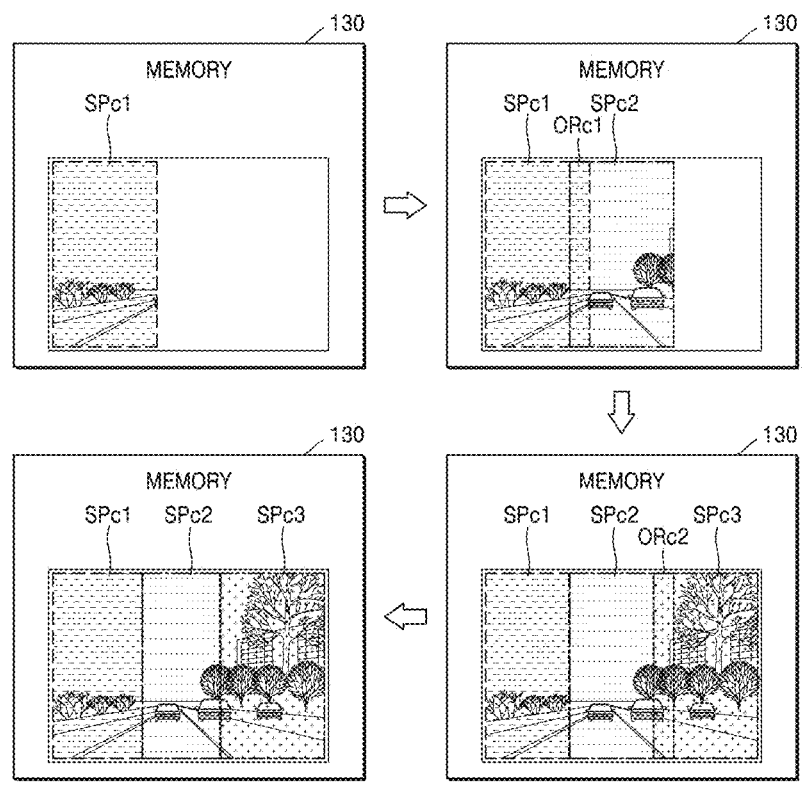

FIGS. 4A and 4B are diagrams illustrating operations of an image signal processor according to some example embodiments.

Referring to FIG. 4A, a raw image RDT may be divided into a plurality of sub-images, for example, first, second, and third sub-images SP1, SP2, and SP3. The first sub-image SP1 may partially overlap the second sub-image SP2 (or vice versa). For example, a first overlap region OR1 may be shared between the first sub-image SP1 and the second sub-image SP2. The second sub-image SP2 may partially overlap the third sub-image SP3 (or vice versa). For example, a second overlap region OR2 may be shared between the second sub-image SP2 and the third sub-image SP3.

An image signal processor 120 may sequentially receive the first, second, and third sub-images SP1, SP2, and SP3. For example, the first sub-image SP1 may be firstly received and image-processed, the second sub-image SP2 may be secondly received and image-processed, and the third sub-image SP3 may be thirdly received and image-processed.

The image signal processor 120 may receive and image-process the first sub-image SP1 and generate a first converted sub-image SPc1. The image signal processor 120 may store the first sub-image SP1 in a plurality of lines in a line buffer LB, and filter the plurality of lines stored in the line buffer LB based on at least one filter to generate the first converted sub-image SPc1. For example, a filter FT having a predetermined (or desired) size may slide a plurality of lines (e.g., line data) of the first sub-image SP1 stored in the line buffer LB in a horizontal direction and filter the plurality of lines. For example, the filter FT may have a resolution (e.g., size) of K*K (where K is an integer equal to or greater than 2).

Other lines of the input image (e.g., the first sub-image SP1) may be sequentially stored in a queue manner in the line buffer LB so that the line data may be updated and the updated line data may be filtered. Accordingly, the first sub-image SP1 may be converted in a direction shown in FIG. 4A. The image signal processor 120 may store the first converted sub-image SPc1 in the memory 130.

Subsequently, the image signal processor 120 may receive and image-process the second sub-image SP2, generate a second converted sub-image SPc2, and store the second converted sub-image SPc2 in the memory 130. When the second converted sub-image SPc2 is stored in the memory 130, the image signal processor 120 may receive and image-process the third sub-image SP3, generate a third converted sub-image SPc3, and store the third converted sub-image SPc3 in the memory 130.

Referring to FIG. 4B, a plurality of converted sub-images, for example, first, second, and third converted sub-images SPc1, SPc2, and SPc3, may be sequentially stored in the memory 130. First, the image signal processor 120 may generate the first converted sub-image SPc1 and store the first converted sub-image SPc1 in the memory 130. Subsequently, the image signal processor 120 may generate the second converted sub-image SPc2 and store the second converted sub-image SPc2 in the memory 130. Both the first converted sub-image SPc1 and the second converted sub-image SPc2 may include a first converted overlap region ORc1. After the first converted sub-image SPc1 is stored, when the second converted sub-image SPc2 is stored, the image signal processor 120 may overwrite data of the first converted overlap region ORc1 included in the first converted sub-image SPc1 with data of the first converted overlap region ORc1 included in the second converted sub-image SPc2.

Thereafter, the image signal processor 120 may generate the third converted sub-image SPc3 and store the third converted sub-image SPc3 in the memory 130. Both the second converted sub-image SPc2 and the third converted sub-image SPc3 may include a second converted overlap region ORc2. After the second converted sub-image SPc2 is stored, when the third converted sub-image SPc3 is stored, the image signal processor 120 may overwrite data of the second converted overlap region ORc2 included in the second converted sub-image SPc2 with data of the second converted overlap region ORc2 included in the third converted sub-image SPc3.

Accordingly, the image signal processor 120 may merge the first, second, and third converted sub-images SPc1, SPc2, and SPc3 together to generate a converted image CDT having the same size (e.g., resolution) as the raw image RDT. Thus, even if a size (e.g., the width W) of the raw image RDT provided by the image sensor 110 is increased, such that the size of the raw image RDT is greater than the size of the line bugger LB, the image signal processor 120 may image-process the raw image RDT having the increased size without increasing the size LS of the line buffer LB, and hence, without increasing the area (e.g., hardware size, width) of the image signal processor 120.

Figure 5:
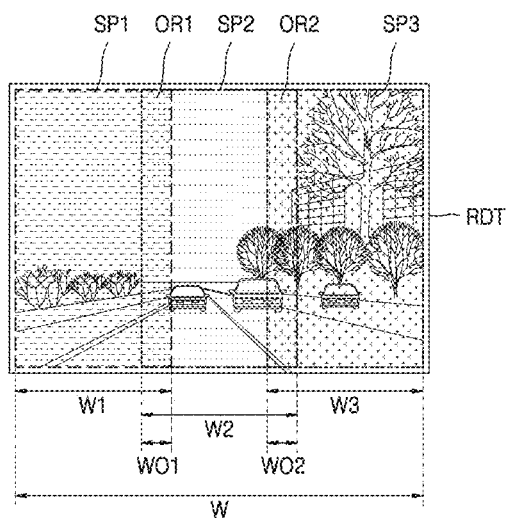
FIG. 5 illustrates an example in which a raw image is divided into a plurality of sub-images, according to some example embodiments.

FIG. 5 illustrates an example in which a raw image RDT is divided into a plurality of sub-images, according to some example embodiments. It is assumed that the raw image RDT is divided into first, second, and third sub-images SP1, SP2, and SP3, for example.

Referring to FIG. 5, the raw image RDT may be divided into first, second, and third sub-images SP1, SP2, and SP3. In some example embodiments, a width W1 of the first sub-image SP1, a width W2 of the second sub-image SP2, and a width W3 of the third sub-image SP3 may be equal to each other. A width WO1 of a first overlap region OR1 shared between the first sub-image SP1 and the second sub-image SP2 may be equal to a width WO2 of a second overlap region OR2 shared between the second sub-image SP2 and the third sub-image SP3. In some other example embodiments, the width W1 of the first sub-image SP1 may be equal to the width W2 of the second sub-image SP2, and the width W3 of the third sub-image SP3 may be different from the width W1 of the first sub-image SP1 and the width W2 of the second sub-image SP2. However, the width WO1 of the first overlap region OR1 may be equal to the width WO2 of the second overlap region OR2.

The width WO1 of the first overlap region OR1 and the width WO2 of the second overlap region OR2 may be determined based on a size of a filter (refer to the filter FT in FIG. 4A) used for an image signal processor (refer to the image signal processor 120 in FIG. 4A). The widths W1, W2, and W3 of the first to third sub-images SP1, SP2, and SP3 may be determined based on a width W of the raw image RDT, a size LS of a line buffer LB, and the widths WO1 and WO2 of the first and second overlap regions OR1 and OR2.

Figure 6:
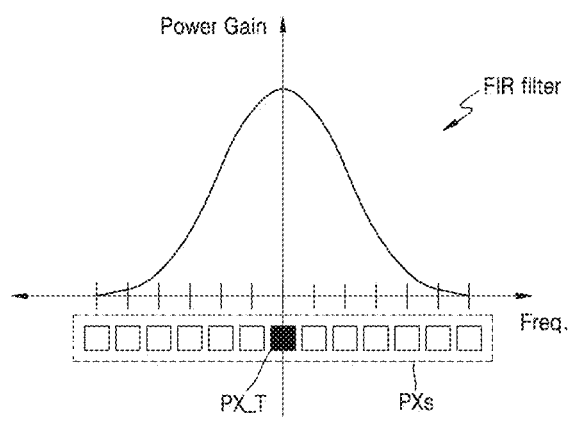
FIG. 6 illustrates an example in which a width of an overlap region between a plurality of sub-images is determined, according to some example embodiments.

FIG. 6 illustrates an example in which a width of an overlap region between a plurality of sub-images is determined, according to some example embodiments.

Referring to FIG. 6, an image signal processor (refer to the image signal processor 120 in FIG. 4A) may include a finite impulse response (FIR) filter. The image signal processor 120 may determine the width (e.g., WO1, WO2) of the overlap region (e.g., OR1, OR2) shared between two adjacent sub-images (e.g., SP1 and SP2, SP2 and SP3) based on a size of the FIR filter. The FIR filter may be a Gaussian filter in which an abscissa denotes a frequency range and an ordinate denotes a power gain. When the FIR filter is applied to target pixel data PX_T, pixel data PXs adjacent to the target pixel data PX_T may be used. As shown in FIG. 6, when the target pixel data PX_T is filtered, the FIR filter may be applied to pixel data PXs located on both sides of the target pixel data PX_T. Assuming that the FIR filter is applied to six pieces of pixel data PXs on each side of the target pixel data PX_T, the overlap region may include at least 12 pieces of pixel data PXs, for example. Accordingly, the width of the overlap region may be determined to be at least 12 bits.

Referring again to FIG. 5, the number of sub-images may be variable. In some example embodiments, the image signal processor (refer to the image signal processor 120 in FIG. 1) may set the number of sub-images as a minimum value based on the width W of the raw image RDT, the size of the line buffer (refer to the line buffer LB in FIG. 4A), and the width (e.g., WO1 and/or WO2) of the overlap region (e.g., OR1 and/or OR2). For example, when the width W of the raw image RDT is 6000 bits and the size of the line buffer LB is 3000 bits, the image signal processor 120 may divide the raw image RDT into three sub-images in view of the width of the overlap region. When the image signal processor 120 sets the number of sub-images as two, a width of each of the two sub-images may be 3000 bits or less. In this case, the overlap region may not be present. That is, the minimum value of the number of sub-images may be determined to be three in the above-described example. Accordingly, the image signal processor 120 may divide the raw image RDT into at least three sub-images in view of the width of the overlap region.

Figure 7:
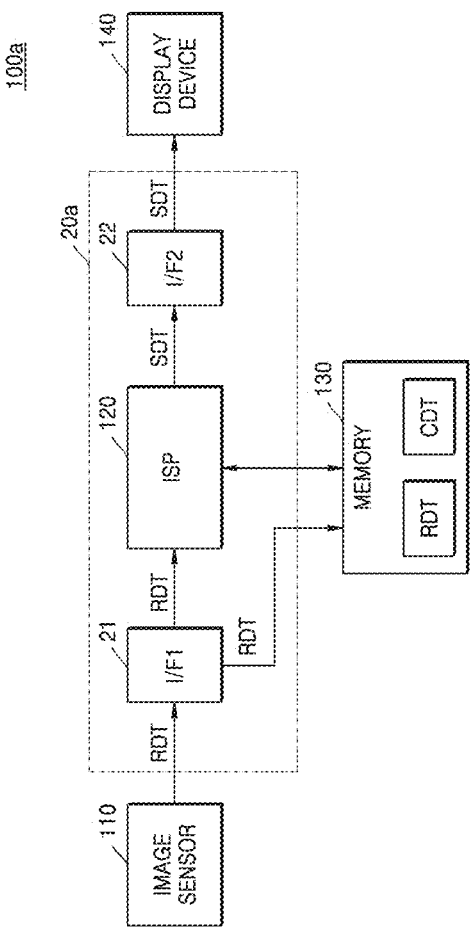
FIG. 7 is a block diagram of an image processing system according to some example embodiments.

FIG. 7 is a block diagram of an image processing system 100a according to some example embodiments.

Referring to FIG. 7, the image processing system 100a may include an image sensor 110, a System-on-Chip (SoC) 20a, a memory 130, and a display device 140. The SoC 20a may include an image signal processor 120, a first interface 21, and a second interface 22, and may further include other functional blocks (not shown). In some example embodiments, the SoC 20a may be implemented as an application processor (AP).

The SoC 20a may receive a raw image RDT from the image sensor 110 via the first interface 21. For example, the first interface 21 may be implemented as an interface technique such as a serial interface, a mobile display digital interface (MDDI), an inter-integrated circuit (I2C) interface, a serial peripheral interface (SPI), a micro controller unit (MCU) interface, a mobile industry processor interface (MIPI), an embedded display port (eDP) interface, a D-sub-miniature (D-sub), an optical interface, and/or a high-definition multimedia interface (HDMI). In addition, the first interface 21 may be implemented as one of various serial or parallel interface techniques.

The first interface 21 may store the received raw image RDT in the memory 130 and/or provide the received raw image RDT to the image signal processor 120. For example, the first interface 21 may provide the raw image RDT to the image signal processor 120 when the image processing system 100a operates in a first operation mode, and the first interface 21 may store the raw image RDT in the memory 130 when the image processing system 100a operates in a second operation mode. For example, the first operation mode may be an image preview mode, while the second operation mode may be an image capture mode. When the image processing system 100a operates in the first operation mode (e.g., the image preview mode), a width of the raw image RDT provided by the image sensor 110 may be equal to or less than a size (e.g., width) of a line buffer (refer to the line buffer LB in FIG. 3) included in the image signal processor 120. When the image processing system 100a operates in the second operation mode (e.g., the image capture mode), a width of the raw image RDT provided by the image sensor 110 may be greater than the size of the line buffer (refer to the line buffer LB in FIG. 3) included in the image signal processor 120.

In the first operation mode (e.g., the image preview mode), the image signal processor 120 may image-process the raw image RDT received from the first interface 21, generate a converted image CDT, scale a size of the converted image CDT, and generate a scaled image SDT. The image signal processor 120 may provide the scaled image SDT to the second interface 22, and the second interface 22 may output the scaled image SDT to the display device 140. The second interface 22 may be implemented as any of the various interface techniques described above in relation to the first interface 21.

In the second operation mode (e.g., the image capture mode), as described above with reference to FIG. 2, the image signal processor 120 may divide the raw image RDT stored in the memory 130 into a plurality of sub-images, sequentially receive the plurality of sub-images from the memory 130, sequentially image-process the plurality of sub-images, and sequentially generate a plurality of converted sub-images. The image signal processor 120 may sequentially store the plurality of converted sub-images, in the order in which the plurality of converted sub-images are sequentially generated due to the image processing operation, in the memory 130. The plurality of converted sub-images may be merged to generate a converted image CDT. The converted image CDT may have the same size (e.g., resolution) as the raw image RDT.

In some example embodiments, the image signal processor 120 may read the converted image CDT from the memory 130, scale a size of the converted image CDT, and generate a scaled image SDT. For example, the image signal processor 120 may reduce a size of the converted image CDT based on a resolution of the display device 140. The image signal processor 120 may provide the scaled image SDT to the second interface 22, and the second interface 22 may output the scale image SDT to the display device 140.

The first operation mode (e.g., the image preview mode) may require a real-time image processing operation to be performed on a raw image RDT having a small size (e.g., having a width that is less than or equal to the size of the line buffer LB included in the image signal processor 120). By contrast, the second operation mode (e.g., the image capture mode) may require the image processing operation to be performed on a raw image having a large size (e.g., having a width that is greater than the size of the line buffer LB included in the image signal processor 120). Accordingly, in the first operation mode, the image sensor 110 may output a raw image RDT having a small size, and the image signal processor 120 may image-process the raw image RDT having the small size at one time. By contrast, in the second operation mode, the image sensor 110 may output a raw image having a large size, and the image signal processor 120 may divide the raw image into a plurality of sub-images and sequentially image-process the plurality of sub-images. Since a real-time image processing operation is not required in the second operation mode (e.g., the image capture mode), even if an image processing time is increased to some extent due to the image division operation as compared to an image processing time in the first operation mode (e.g., the image preview mode), the influence of the increased image processing time upon an operation speed of the image processing system 100a in the second operation mode may be negligible.

Figure 8A:
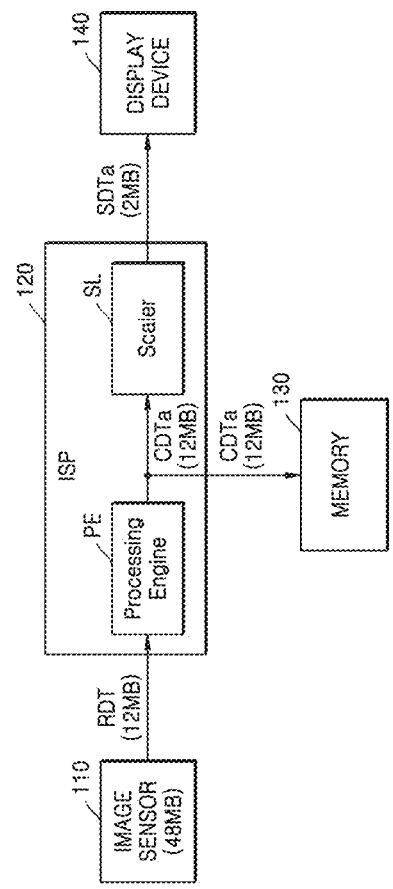
FIGS. 8A and 8B illustrate an image processing process of the image processing system of FIG. 7.
Figure 8B:
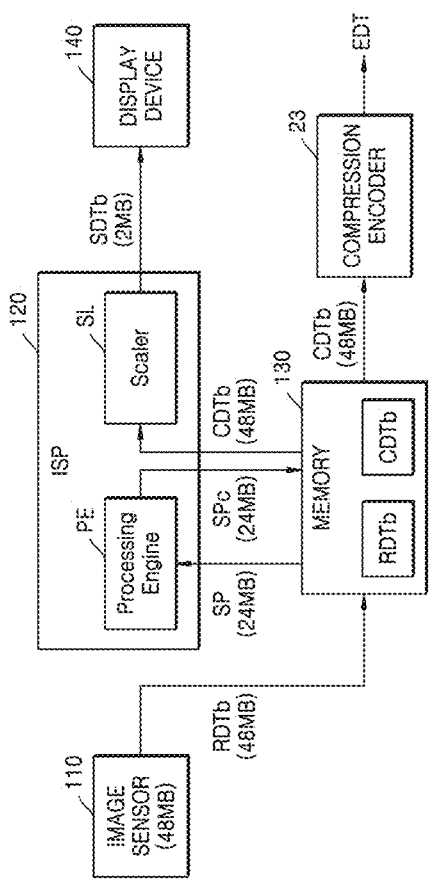

FIGS. 8A and 8B illustrate an image processing process of the image processing system 100a of FIG. 7.

FIG. 8A illustrates an operation in a first operation mode, and FIG. 8B illustrates an operation in a second operation mode. Specific numerical values shown in FIGS. 8A and 8B are used only for simplicity of illustration and are not intended to limit the inventive concepts.

Referring to FIG. 8A, a resolution of an image sensor 110 may be 48 megabytes (MB) or less. In the first operation mode, for example, in an image preview mode, the image sensor 110 may output a raw image RDTa having a size of 12 MB that is ¼ a maximum size of the image sensor 110. As described above with reference to FIG. 7, in the first operation mode, the raw image RDTa may be transmitted to an image signal processor 120.

The image signal processor 120 may include a processing engine PE and a scaler SL. The processing engine PE may include a line buffer (not shown). The processing engine PE may image-process the raw image RDTa and generate a converted image CDTa. A size of the converted image CDTa may be 12 MB, which is equal to the size of the raw image RDTa. The converted image CDTa may be provided to the scaler SL. In some example embodiments, the converted image CDTa may also be stored in a memory 130. The scaler SL may scale the converted image CDTa (e.g., to reduce the size of the converted image CDTa) so that the converted image CDTa may be displayed on a display device 140. For example, the scaler SL may scale the 12 MB converted image CDTa and generate a 2 MB scaled image SDTa. The image signal processor 120 may output the scaled image SDTa to the display device 140. The display device 140 may display the scaled image SDTa.

Referring to FIG. 8B, in the second operation mode, for example, in an image capture mode, the image sensor 110 may output a full-size raw image RDTb, for example, a 48 MB raw image RDTb. The raw image RDTb may be stored in the memory 130. A width of the raw image RDTb may be greater than a size of the line buffer included in the image signal processor 120. The image signal processor 120 may divide the raw image RDTb into a plurality of sub-images SP, sequentially receive the plurality of sub-images SP from the memory 130, and sequentially image-process the plurality of sub-images SP to generate a plurality of converted sub-images SPc. For example, the image signal processor 120 may divide the raw image RDTb into two sub-images SP having a size of about 24 MB each. A width of the sub-images SP may be less than the size of the line buffer included in the image signal processor 120. The processing engine PE may image-process the two sub-images SP, which are sequentially received from the memory 130 to generate the two converted sub-images SPc. The two converted sub-images SPc may be stored in the memory 130 and merged together to constitute a 48 MB converted image CDTb.

The image processing system 100a may include a compression encoder 23. For example, the compression encoder 23 may be included in an SoC (refer to the SoC 20a in FIG. 7). The compression encoder 23 may receive the converted image CDTb from the memory 130, encode the converted image CDTb, and output an encoded image EDT (e.g., a compressed image). In some example embodiments, the compression encoder 23 may be a JPEG module. The JPEG module may encode the converted image CDTb and output a JPEG format image. The JPEG format image may be stored in a storage including a non-volatile memory, for example.

In some example embodiments, when a user intends to see a captured image, the image signal processor 120 may reduce a size of the converted image CDTb and generate a scaled image SDTb to be displayed on the display device 140.

The image signal processor 120 may include the scaler SL configured to scale a size of an image. The scaler SL may receive the converted image CDTb from the memory 130 and reduce a size of the converted image CDTb. For example, the scaler SL may scale the 48 MB converted image CDTb into a 2 MB scaled image SDTb. The image signal processor 120 may output the scaled image SDTb to the display device 140. The display device 140 may display the scaled image SDTb.

Figure 9:
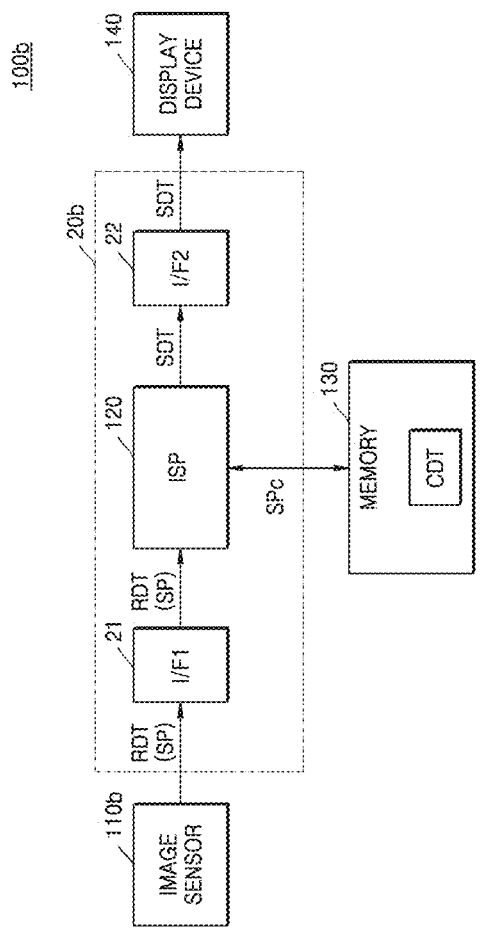
FIG. 9 is a block diagram of an image processing system according to some example embodiments.

FIG. 9 is a block diagram of an example of an image processing system 100b according to some example embodiments.

Referring to FIG. 9, the image processing system 100b may include an image sensor 110b, an SoC 20b, a memory 130, and a display device 140. The SoC 20b may include an image signal processor 120, a first interface 21, and a second interface 22, and may further include other functional blocks (not shown).

Operations of the image processing system 100b of FIG. 9 may be similar to operations of the image processing system 100a of FIG. 7. Thus, repeated descriptions thereof will be omitted, and differences between the operations of the image processing system 100b of FIG. 9 and the operations of the image processing system 100a of FIG. 7 will be described.

When the image processing system 100b operates in a second operation mode (e.g., an image capture mode), a width of a raw image RDT provided by the image sensor 110b may be greater than a size of a line buffer included in the image signal processor 120. In this case, the image sensor 110b may divide the raw image RDT into a plurality of sub-images SP and sequentially output the plurality of sub-images SP to the SoC 20b. The first interface 21 may sequentially receive the plurality of sub-images SP from the image sensor 110b and transmit the plurality of sub-images SP to the image signal processor 120. The image signal processor 120 may sequentially receive the plurality of sub-images SP from the image sensor 110b, sequentially image-process the plurality of sub-images SP, and store a plurality of converted images SPc, which are sequentially generated due to the image processing operation, in the memory 130. The image signal processor 120 may merge the plurality of converted images SPc together to constitute a converted image CDT having the same size as the raw image RDT.

As described above, in the second operation mode, the image sensor 110b may divide the raw image RDT into the plurality of sub-images SP and sequentially output the plurality of sub-images SP to the SoC 20b. Thus, an operation of providing the plurality of sub-images SP from the memory 130 to the image signal processor 120 after storing the raw image RDT in the memory 130 may be omitted.

Figure 10:
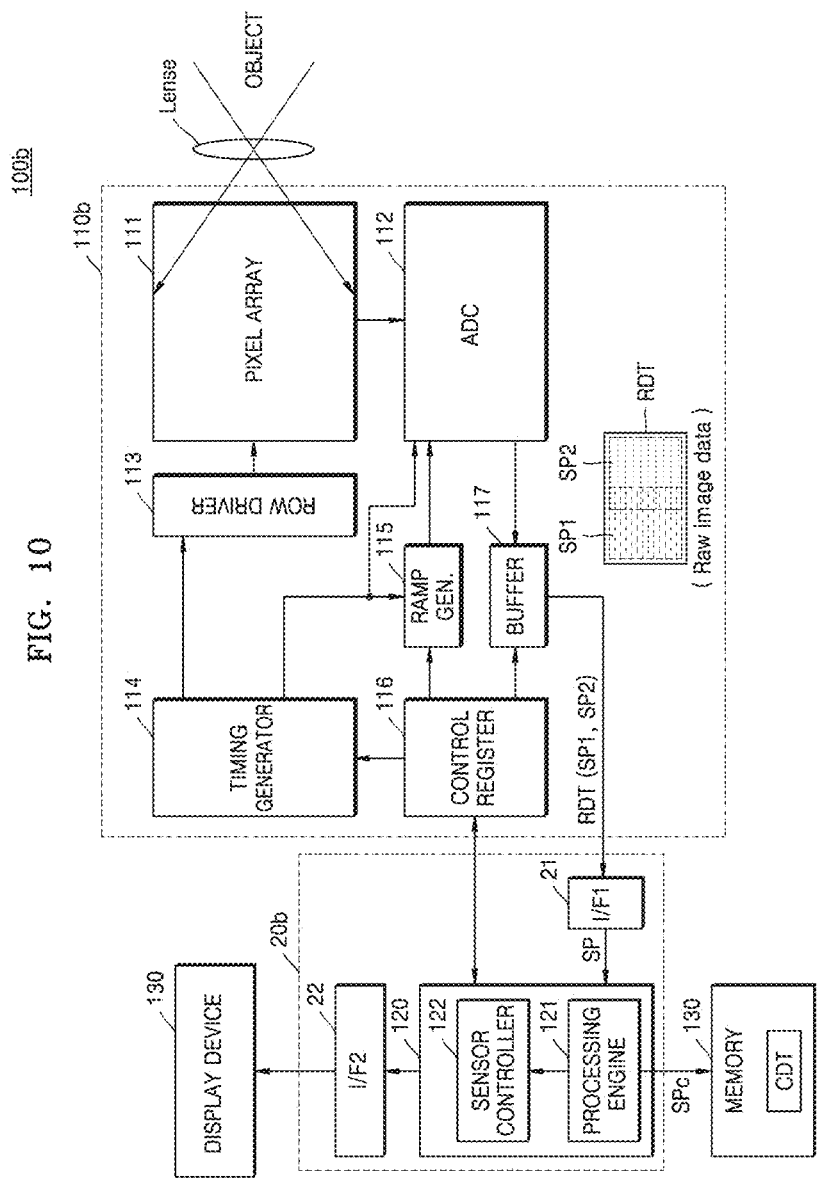
FIG. 10 is a detailed block diagram of the image processing system of FIG. 9.

FIG. 10 is a detailed block diagram of the image processing system 100b of FIG. 9.

Referring to FIG. 10, the image sensor 110b may include a pixel array 111, an analog-to-digital converter (ADC) 112, a row driver 113, a timing generator 114, a ramp signal generator 115, a control register 116, and a buffer 117.

The pixel array 111 may include a plurality of pixels arranged in a matrix form and may convert an optical image signal into an electric pixel signal using each of the plurality of pixels.

The row driver 113 may drive the pixel array 111 in row units via control of the timing generator 114. The row driver 113 may decode a row control signal (e.g., an address signal) generated by the timing generator 114 and select at least one row line from among row lines included in the pixel array 111 in response to the decoded row control signal. The pixel array 111 may output a pixel signal to the ADC 112 from a row, which is selected based on the row control signal provided by the row driver 113.

The ADC 112 may compare the pixel signal received from the pixel array 111 with a ramp signal provided by the ramp signal generator 115, generate a result signal, count the result signal, and convert the counted result signal into a digital signal. The ADC 112 may output the converted signal as a raw image RDT to the buffer 117.

The timing generator 114 may control operations of the row driver 113, the ADC 112, and the ramp signal generator 115 via control of the control register 116.

The control register 116 may control operations of each of the timing generator 114, the ramp signal generator 115, and the buffer 117. The control register 116 may operate via control of a sensor controller 122 included in the image signal processor 120.

The buffer 117 may temporarily store the raw image RDT received from the ADC 112 and output the raw image RDT to the SoC 20b. In a second operation mode (e.g., an image capture mode), the buffer 117 may divide the raw image RDT into a plurality of sub-images, for example, a first sub-image SP1 and a second sub-image SP2, via the control of the control register 116 and sequentially output the plurality of sub-images to the SoC 20b.

The image signal processor 120 may include a processing engine 121 and a sensor controller 122. Although not shown, the image signal processor 120 may further include other components, such as a line buffer and a scaler. The processing engine 121 may image-process the raw image RDT received from the buffer 117 through the first interface 21. In the second operation mode (e.g., the image capture mode), the processing engine 121 may image-process the plurality of sub-images SP (e.g., the first sub-image SP1 and the second sub-image SP2), which are sequentially received, generate a plurality of converted sub-images SPc (e.g., a first converted sub-image SPc1 and a second converted sub-image SPc2), and store the plurality of converted sub-images SPc in the memory 130. The plurality of converted sub-images SPc stored in the memory 130 may be merged to generate a converted image CDT having a same size as the raw image RDT.

The sensor controller 122 may control the control register 116 so that the buffer 117 of the image sensor 110b may sequentially output the plurality of sub-images SP to the SoC 20b. In some example embodiments, the sensor controller 122 may output a control signal indicating information (e.g., the number of sub-images SP, a width of the plurality of sub-images SP, and a width of an overlap region shared between two adjacent sub-images) for dividing the raw image RDT into the plurality of sub-images SP to the control register 116. In some example embodiments, when the imaging-processing of a received sub-image is completed, the processing engine 121 may transmit a completion signal to the sensor controller 122, and the sensor controller 122 may output a control signal for requesting the buffer 117 of the image sensor 110b to transmit another received sub-image (e.g., the next sub-image in the order in which the plurality of sub-images are received), to the control register 116 in response to the completion signal.

Figure 11:
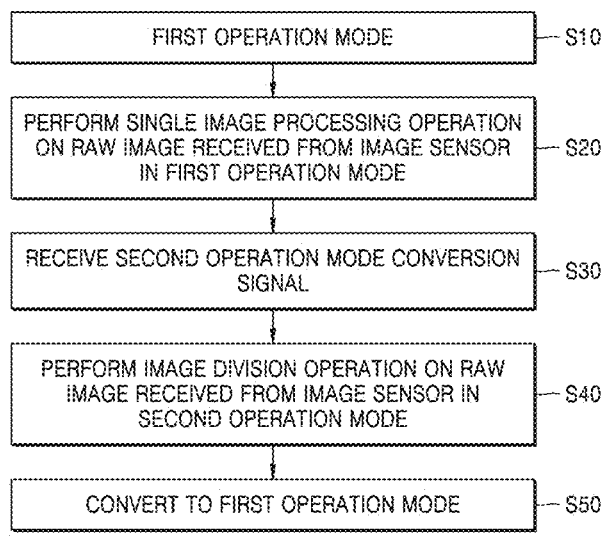
FIG. 11 is a flowchart of an operation of an image signal processor according to some example embodiments.

FIG. 11 is a flowchart of an operation of an image signal processor (refer to the image signal processor 120 in FIG. 1) according to some example embodiments.

Referring to FIG. 11, the image signal processor 120 may operate in a first operation mode (S10). An image processing system (refer to the image processing system 100 in FIG. 1) (e.g., a camera and a smartphone) including the image signal processor 120 may normally operate in a first operation mode (e.g., an image preview mode). When a user input for requesting an image capture operation is received, an operation mode of the image processing system 100 may be converted so that the image processing system 100 may operate in a second operation mode, for example, an image capture mode. Accordingly, the image signal processor 120 may firstly operate in the first operation mode.

The image signal processor 120 may perform a single image processing operation on a raw image that is received from an image sensor in the first operation mode (S20). For example, a width of the raw image may be less than or equal to a line buffer included in the image signal processor 120. The image signal processor 120 may store the raw image in units of a plurality of lines in the line buffer and perform an image processing operation on the raw image in the units of the plurality of lines. The image signal processor 120 may scale a size of a converted image generated due to the image processing operation and provide the scaled image to a display device. The scaled image may be displayed on the display device.

The image signal processor 120 may receive a second operation mode conversion signal (S30). In response to the user input for requesting the image capture operation, the operation mode of the image processing system 100 may be converted into the second operation mode, for example, the image capture mode. The image signal processor 120 may receive the second operation mode conversion signal for requesting the conversion of the operation mode into the second operation mode from the image processing system 100.

When the operation mode is converted into the second operation mode, the image signal processor 120 may perform an image division operation on a raw image that is received from the image sensor in the second operation mode (S40). The image signal processor 120 may divide the raw image into a plurality of sub-images in a column direction and sequentially image-process the plurality of sub-images. The image division operation in the second operation mode will be described below in further detail with reference to FIG. 12.

In operation S40, when the image division operation on the raw image is completed, the converted image may be stored in a memory. Thereafter, the operation mode of the image processing system 100 may be converted into the first operation mode (S50). The image signal processor 120 may be converted into the first operation mode (e.g., the image preview mode) in response to an operation mode conversion signal or automatically (e.g., in response to completion of the image division operation). In some example embodiments, the second operation mode may be executed as a background operation in the image processing system 100.

Figure 12:
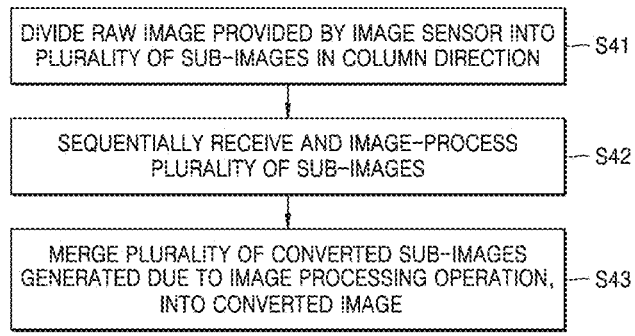
FIG. 12 is a flowchart of an operation of an image signal processor according to some example embodiments.

FIG. 12 is a flowchart of an operation of an image signal processor according to some example embodiments. FIG. 12 illustrates an example embodiment in which an image signal processor (refer to the image signal processor 120 in FIG. 1) operates in a second operation mode (e.g., an image capture mode).

In the second operation mode, a width of a raw image received from an image sensor (refer to the image sensor 110 in FIG. 1) may be greater than a size of a line buffer included in the image signal processor 120.

Referring to FIG. 12, the image signal processor 120 may divide the raw image, which is received from the image sensor 110, into a plurality of sub-images in a column direction (S41). A sub-image may also be referred to as a column image and/or a vertical stripe image, for example. The image signal processor 120 may determine parameters, such as the number of sub-images, a width of each of the plurality of sub-images, and a width of an overlap region shared between two adjacent sub-images, based on a width of the raw image, a size of a line buffer, and a size of a filter used in the image signal processor 120 to image-process the plurality of sub-images. The image signal processor 120 may divide the raw image into the plurality of sub-images based on the determined parameters.

The image signal processor 120 may sequentially receive and image-process the plurality of sub-images (S42). The raw image may be stored in an internal memory of the image sensor 110 or output by the image sensor 110 and stored in a memory (refer to the memory 130 in FIG. 1) (e.g., DRAM)

included in an image processing system (refer to the image processing system 100 in FIG. 1). For example, the image signal processor 120 may receive a sub-image (e.g., a first sub-image) from the memory 130 in which the raw image is stored, and receive another sub-image (e.g., a second sub-image) when an image processing operation on the received sub-image (e.g., the first sub-image) is completed. The image signal processor 120 may store the received sub-image in units of a plurality of lines in the line buffer and perform an image processing operation in the units of the plurality of lines.

The image signal processor 120 may merge a plurality of converted sub-images, which are generated due to the image processing operation on the plurality of sub-images, into a converted image (S43). The image signal processor 120 may store the plurality of converted sub-images, which are sequentially generated, in the memory 130 in the order in which the plurality of converted sub-images are generated. The image signal processor 120 may determine an address of a region of the memory 130 in which the plurality of converted sub-images are to be stored to merge the plurality of converted sub-images, and store the plurality of converted sub-images in the region of the memory 130, which corresponds to the address. Accordingly, the plurality of converted sub-images may be merged to reconfigure one converted image having the same size as the raw image.

Figure 13:
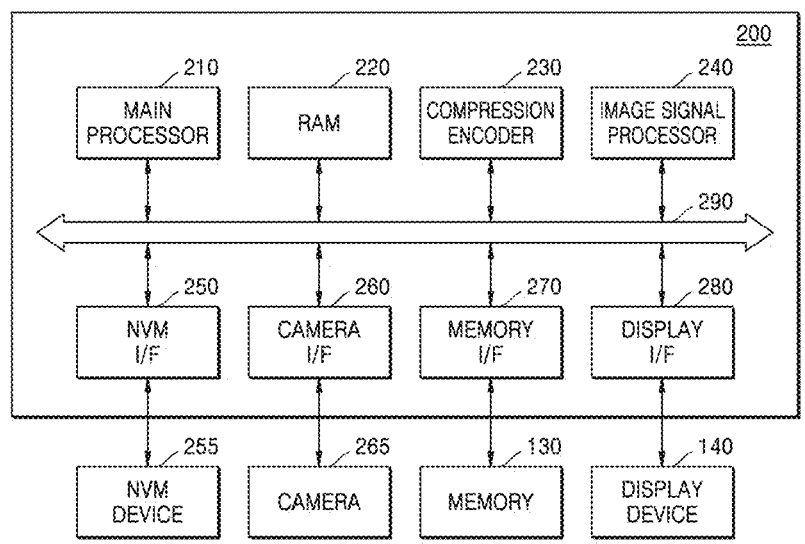
FIG. 13 is a block diagram of an application processor (AP) according to some example embodiments.

FIG. 13 is a block diagram of an application processor (AP) 200 according to some example embodiments.

Referring to FIG. 13, the AP 200 may include a main processor 210, a RAM 220, a compression encoder 230, an image signal processor 240, a non-volatile memory interface 250, a camera interface 260, a memory interface 270, and a display interface 280, which may transmit and receive data to and from each other through a bus 290.

The main processor 210 may control the overall operation of the AP 200. The main processor 210 may be implemented as, for example, a central processing unit (CPU) and/or a microprocessor (MP). In some example embodiments, the main processor 210 may be implemented as one computing component (e.g., a multi-core processor) having at least two independent processors (or cores). The main processor 210 may process data and/or execute programs stored in the RAM 220 (and/or stored in a ROM).

The RAM 220 may temporarily store programs, data, and/or instructions. In some example embodiments, the RAM 220 may be implemented as DRAM or SRAM. The RAM 220 may temporarily store images, which may be input and/or output through the non-volatile memory interface 250, the camera interface 260, the memory interface 270, and the display interface 280 and/or generated by the image signal processor 240 and/or the main processor 210.

In some example embodiments, the AP 200 may further include a ROM (not shown). The ROM may store continuously used programs and/or data. The ROM may be implemented as erasable programmable ROM (EPROM) or electrically erasable programmable ROM (EEPROM), for example.

The non-volatile memory interface 250 may interface with data input from and/or output to a non-volatile memory device 255. The non-volatile memory device 255 may be implemented as, for example, a memory card (e.g., a multimedia card (MMC), an embedded MMC (eMMC), a secure digital (SD) card, and/or a micro SD card).

The camera interface 260 may interface with data (e.g., a raw image) input from a camera 265 located outside the AP 200. The camera 265 may generate data of an image captured by using a plurality of photo-sensing elements. The raw image received through the camera interface 260 may be provided to the image signal processor 240 and/or stored in a memory 130 through the memory interface 270.

The memory interface 270 may interface with data input from and/or output to the memory 130 located outside the AP 200. In some example embodiments, the memory 130 may be implemented as a volatile memory, such as DRAM and/or SRAM, or a non-volatile memory, such as ReRAM, PRAM, and/or a NAND flash device.

The display interface 280 may interface with data (e.g., an image, such as a converted image and/or a scaled image) output to the display device 140. The display device 140 may display an image or data of the image and may be implemented as a liquid crystal display (LCD) and/or an active-matrix organic light emitting diode (AMOLED) display, for example.

The compression encoder 230 may encode an image and output an encoded image (i.e., a compressed image). The compression encoder 230 may encode a converted image output by the image signal processor 240 and/or a converted image stored in the memory 130. In some example embodiments, the compression encoder 230 may be a JPEG module, which may output a JPEG format image. The JPEG format image may be stored in the non-volatile memory device 255.

The image signal processor 240 may image-process an image (e.g., a raw image) provided by the camera 254, generate a converted image, and store the converted image in the memory 130. Alternatively or additionally, the image signal processor 240 may scale the converted image, generate a scaled image, and output the scaled image to the display device 140.

When the image signal processor 240 operates in a second operation mode (e.g., an image capture mode), when a width of the raw image is greater than a size of a line buffer included in the image signal processor 240, the image signal processor 240 may divide the raw image into a plurality of sub-images and sequentially image-process the plurality of sub-images, as described above with reference to FIGS. 1 to 12. Accordingly, even if a size (e.g., width) of the raw image increases with an increase in the resolution of the camera 265 so as to be greater than a size of a line buffer included in the image signal processor 240, the image signal processor 240 may image-process the raw image, by sequentially performing the image processing operation on the plurality of sub-images, without increasing an area (e.g., hardware size, width) of the line buffer.

Figure 14:
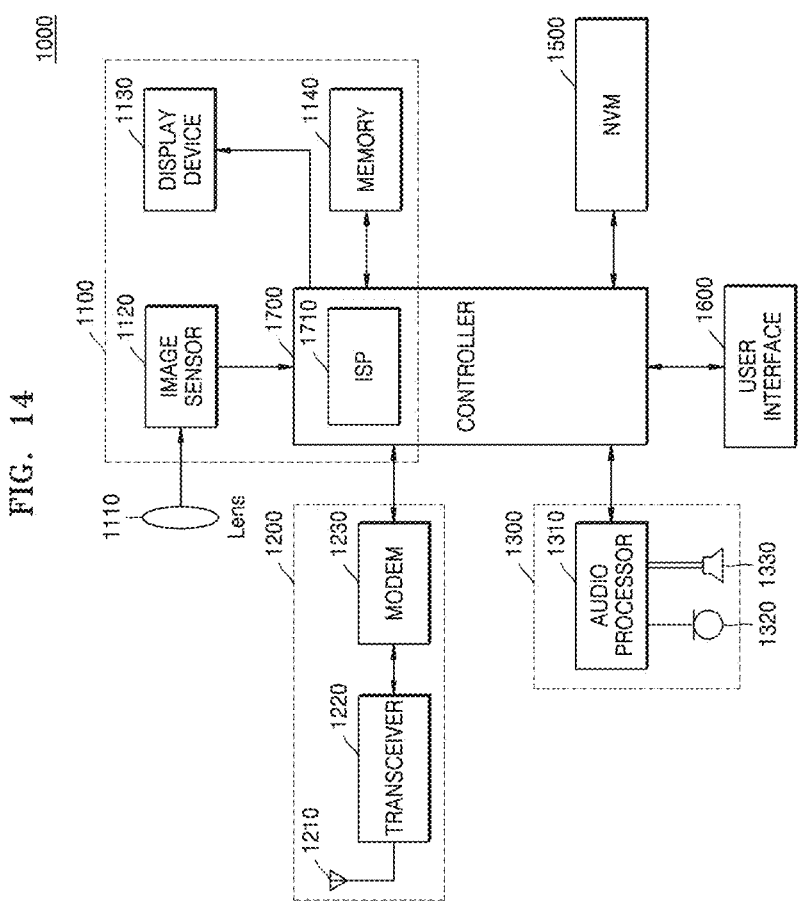
FIG. 14 is a block diagram of a portable terminal according to some example embodiments.

FIG. 14 is a block diagram of a portable terminal 1000 according to some example embodiments. Referring to FIG. 14, the portable terminal 1000 may include an image processor 1100, a wireless transceiver 1200, an audio processor 1300, a non-volatile memory device 1500, a user interface 1600, and a controller 1700.

The image processor 1100 may include a lens 1110, an image sensor 1120, a display device 1130, a memory 1140, and an image signal processor 1710. In some example embodiments, as shown in FIG. 14, the image signal processor 1710 may be implemented as a portion of the controller 1700.

The image signal processor 1710 may image-process an image (e.g., a raw image) received from the image sensor 1120, generate a converted image, and store the converted image in the memory 1140. Alternatively or additionally, the image signal processor 1710 may scale the converted image and provide the scaled image to the display device 1130. When the image signal processor 1710 operates in a second operation mode (e.g., an image capture mode), when a width of the image (e.g., the raw image) received from the image sensor 1120 is greater than a size of a line buffer included in the image signal processor 1710, the image signal processor 1710 may divide the raw image into a plurality of sub-images, sequentially image-process the plurality of sub-images, sequentially generate a plurality of converted sub-images, and merge the plurality of converted sub-images together to generate a converted image having the same size as the raw image, as described above with reference to FIGS. 1 to 12. The converted image may be stored in the memory 130 and/or displayed on the display device 140.

The wireless transceiver 1200 may include an antenna 1210, a transceiver 1220, and a modem 1230. The audio processor 1300 may include an audio processor 1310, a microphone 1320, and a speaker 1330. The non-volatile memory device 1500 may be implemented as a memory card (e.g., MMC, eMMC, SD, and/or a micro SD).

The user interface 1600 may be implemented as one of various devices capable of receiving user input, for example, a keyboard, a curtain key panel, a touch panel, a fingerprint sensor, and a microphone. The user interface 1600 may receive the user input and provide signals corresponding to the received user input to the controller 1700.

The controller 1700 may control the overall operation of the portable terminal 1000 and be implemented as an SoC configured to drive an application program and/or an operating system. A kernel of the operating system driven by the SoC may include an input/output (I/O) scheduler and a device driver configured to control the non-volatile memory device 1500.

Some example embodiments of the inventive concepts are disclosed in the above description and the drawings. Although specific terms are employed, they are used in a descriptive sense only and not for purposes of limitation. It will be understood by those of ordinary skill in the art that various changes in form and details may be made to the disclosed example embodiments without departing from the spirit and scope of the inventive concepts as defined by the following claims.

What is claimed is:

1. An image signal processor for generating a converted image based on a raw image provided by an image sensor, the image signal processor comprising:
   processing circuitry configured to
      store data corresponding to a plurality of lines of a received image in a line buffer;
      perform an image processing operation by filtering the data stored in the line buffer based on at least one filter;
      determine a number of sub-images based on a width of the raw image, a width of an overlap region, and a size of the line buffer, in response to the width of the raw image being larger than the size of the line buffer, the overlap region being a region shared between two adjacent sub-images; and
      divide the raw image into a plurality of sub-images equal to the determined number of sub-images and request the plurality of sub-images from a first memory in which the raw image is stored, such that the plurality of sub-images are sequentially received by the line buffer, a width of each of the plurality of sub-images being less than a width of the line buffer, and the plurality of sub-images being parallel to each other.

2. The image signal processor of claim 1, wherein the processing circuitry is configured to divide the raw image into the plurality of sub-images such that at least two adjacent sub-images partially overlap each other.

3. The image signal processor of claim 2, wherein the processing circuitry is configured to determine the width of the overlap region based on a size of the at least one filter.

4. The image signal processor of claim 3, wherein the at least one filter comprises a finite impulse response (FIR) filter.

5. The image signal processor of claim 3, wherein the processing circuitry is configured to determine the width of each of the plurality of sub-images based on the width of the raw image, the width of the line buffer, and the width of the overlap region.

6. The image signal processor of claim 1, wherein the processing circuitry is configured to
   sequentially image-process the plurality of sub-images in an order in which the plurality of sub-images are received by the line buffer and generate a plurality of converted sub-images, and
   sequentially store the plurality of converted sub-images in at least one of the first memory or a second memory in an order in which the plurality of converted sub-images are generated and merge the plurality of converted sub-images into the converted image, the converted image having a same size as the raw image.

7. The image signal processor of claim 6, wherein the processing circuitry is configured to determine an address of a region in which the plurality of converted sub-images are to be stored, such that the plurality of converted sub-images stored in the at least one of the first memory or the second memory constitute the converted image.

8. The image signal processor of claim 1, wherein the processing circuitry is further configured to convert a size of the converted image based on a resolution of a display device.

9. The image signal processor of claim 1, wherein the first memory is configured to store the raw image received from the image sensor and sequentially provide the plurality of sub-images of the raw image to the line buffer in response to the request for the plurality of sub-images.

10. The image signal processor of claim 1, wherein the first memory comprises a buffer included in the image sensor.

11. The image signal processor of claim 1, wherein:
   the raw image includes a first raw image and a second raw image;
   in a first operation mode, the processing circuitry is configured to
      receive the first raw image, a width of the first raw image being equal to or less than the width of the line buffer,
      image-process the first raw image to generate a first converted image, a size of the first converted image being equal to a size of the first raw image, and
      scale the first converted image to generate a scaled image and output the scaled image to a display; and
   in a second operation mode, the processing circuitry is configured to
      receive the second raw image, a width of the second raw image being greater than the width of the line buffer,
      divide the second raw image into the plurality of sub-images,
      sequentially image-process the plurality of sub-images to generate a plurality of converted sub-images, merge the plurality of converted sub-images into a second converted image, a size of the second converted image being equal to a size of the second raw image, encode the second converted image to generate a encoded image, and store the encoded image in a storage.

12. A method of operating an image signal processor configured to image-process a raw image generated by an image sensor, wherein the image signal processor includes a line buffer having a size smaller than a width of the raw image and at least one filter, the method comprising:

determining a number of stripe images based on the width of the raw image, a width of an overlap region, and the size of the line buffer, in response to a width of the raw image being larger than the size of the line buffer, the overlap region being a region shared between two adjacent sub-images;

dividing the raw image into a plurality of stripe images, equal to the determined number of stripe images, a size of each of the plurality of stripe images in a first direction being less than the size of the line buffer, and the plurality of stripe images being parallel to each other;

sequentially image-processing the plurality of stripe images by using the line buffer and the at least one filter to generate a plurality of converted stripe images; and merging the plurality of converted stripe images into a converted image having a same size as the raw image.

13. The method of claim 12, wherein two adjacent stripe images of the plurality of stripe images partially overlap each other.

14. The method of claim 13, wherein the width of the overlap region is determined based on a size of the at least one filter.

15. The method of claim 12, wherein the sequentially image-processing of the plurality of stripe images comprises:

sequentially receiving a first stripe image of the plurality of stripe images in units of lines from an external memory of the image signal processor in which the raw image is stored, the sequentially receiving the first stripe image being performed by the line buffer;

filtering data of the first stripe image stored in the line buffer and generating a converted first stripe image, the filtering and the generating being performed by the at least one filter;

sequentially receiving a second stripe image of the plurality of stripe images in units of lines from the external memory upon the generating of the converted first stripe image being completed, the sequentially receiving the second stripe image being performed by the line buffer; and filtering data of the second stripe image stored in the line buffer and generating a converted second stripe image, the filtering and the generating being performed by the at least one filter.

* * * * *